US006918717B2

(12) United States Patent
Ben-Mucha

(10) Patent No.: US 6,918,717 B2
(45) Date of Patent: Jul. 19, 2005

(54) TOOL AND METHOD FOR THE MACHINE WORKING OF WORKPIECES

(75) Inventor: David Ben-Mucha, Nahariya (IL)

(73) Assignee: Vargus Ltd., (IL)

( * ) Notice: Subject to any disclaimer, the term of this patent is extended or adjusted under 35 U.S.C. 154(b) by 0 days.

(21) Appl. No.: 10/712,183

(22) Filed: Nov. 13, 2003

(65) Prior Publication Data

US 2005/0105974 A1    May 19, 2005

(51) Int. Cl.⁷ .............................................. B26D 1/00
(52) U.S. Cl. ...................................... 407/103; 407/107
(58) Field of Search ............................... 407/103, 107, 407/108, 113, 64, 65, 66

(56) References Cited

U.S. PATENT DOCUMENTS

| 3,271,842 | A | * | 9/1966 | Breuning | 407/114 |
| 3,662,444 | A | * | 5/1972 | Erkfritz | 407/41 |
| 4,425,063 | A | * | 1/1984 | Striegl | 408/81 |
| 5,816,753 | A | * | 10/1998 | Hall | 408/224 |
| 6,527,485 | B1 | * | 3/2003 | Little | 407/24 |
| 2002/0192042 | A1 | | 12/2002 | Rydberg | |

FOREIGN PATENT DOCUMENTS

| DE | 3632296 A1 | 4/1988 |
| DE | 4214355 A1 | 11/1993 |
| EP | 0 861 700 A1 | 10/1997 |
| GB | 1 171 868 A1 | 11/1969 |
| SU | 1184611 A1 | 10/1985 |

* cited by examiner

Primary Examiner—Willmon Fridie, Jr.
(74) Attorney, Agent, or Firm—Akerman Senterfitt

(57) ABSTRACT

A tool for the machine working of workpieces is more particularly provided for universal machines, which automatically work very small workpieces by different lathe working operations. A cutting insert (13) can be fixed in a tool holder (14) by means of a fixing screw (19). The cutting insert (13) is constructed as a reversing plate and has two conical receptacles for the conical gripping head (25) of the fixing screw (19). This reversing plate has several use possibilities, such as grooving, plunge and turn, threading, front turn, back turn and cut off. The central opening (30) in the cutting insert is connected by means of a slot (36) to the narrower trapezoidal surface (35) of the cutting insert, the slot (36) being sufficiently wide to fit over the shank of the fixing screw (19). Thus, after loosening the fixing screw, the cutting insert can be removed laterally and correspondingly fitted again. The screw (19) is captive and can also be operated from the back (48) of the tool holder (14).

20 Claims, 4 Drawing Sheets

TOOL AND METHOD FOR THE MACHINE WORKING OF WORKPIECES

BACKGROUND OF THE INVENTION

The invention relates to a tool for machine working of workpieces, particularly on universal machines by lathe working. The tool has a tool holder, which is provided with a fixing element with a shank section and a gripping head thickened compared therewith, as well as a cutting insert to be fixed thereto and which has at least one blade, usually two blades, an opening for the fixing element and at least one gripping surface cooperating with the gripping head. The tool holder has a gripping device for the fixing element.

Such tools are known from DE 36 32 296 A and DE 42 14 355 A. In the case of the latter tools the fixing element comprises a clamping screw, which projects through a round hole, having a conical land, in a triangular or trapezoidal cutting insert.

Particularly in the case of universal or automatic machines for the working of very small, precision mechanical workpieces, such as the spindles of clocks and watches and the like, both the cutting inserts and the tool holders are very small. As such universal machines have linear or turret-like tool changers in which the tools are housed in very closely juxtaposed manner and such machines are normally operated continuously in three shifts and only trained personnel are provided for the monitoring of their otherwise automatic operation, a problem arises if a tool has to be replaced, e.g. because it has been damaged. In this case it is normally necessary to wait for a setter, i.e. a qualified fitter, who replaces the tool.

OBJECTS OF THE INVENTION

Therefore the object of the invention is to create a tool of the aforementioned type, a cutting insert and a method for fitting the cutting insert, in which a tool change is simplified in that it can be carried out by a less well trained person without impairing the machining or working quality.

SUMMARY OF THE INVENTION

The invention includes by a tool having a cutting insert, which is provided with a slot linking the opening to an outer edge of the cutting insert and which has a width which is no smaller than the thickness of the shank section of the fixing element.

In this way following the loosening of the fixing element, it is possible to extract the cutting insert transversely to the longitudinal extension of the tool holder, i.e. usually upwards, without completely separating or unscrewing from the tool holder the fixing element, i.e. in most cases the fixing screw. Specifically in the case of small and difficultly accessible tool holders this constitutes an important advantage. Advantageously the fixing element can be located in captive manner on the tool holder, so that it cannot drop into the chip bin, where it is usually irretrievable. This solution also makes it possible to choose fixing elements other than screws, e.g. a cam-clamp fastener.

A further important advantage is obtained if the fixing element is operable for clamping and unclamping purposes from the side of the tool holder opposite to the cutting insert and preferably from both sides. It is consequently possible to loosen the cutting insert from the rear, particularly in that e.g. in the screw shank is provided an inner gripping surface (hexagonal recess, hexagonal socket head or the like). These internal key surfaces make it possible to apply a corresponding tool from the rear, because on the side where the cutting insert is fixed to the tool holder accessibility is usually impaired by the machine chuck.

The gripping head and the associated gripping surface can be substantially conical. As the slot width is preferably smaller than the transverse dimensions of the gripping head, despite the slot there is a self-centring of the cutting insert on tightening the fixing element.

The cutting insert preferably has at least one leg bounding the gap and which is bevelled towards the gap. If the cutting insert has a symmetrical construction, then the two legs bounding the gap give a wedge-shaped orienting surface, which cooperate with corresponding inclined surfaces on the tool holder to bring about a precise orientation of the cutting insert relative to the tool holder. This construction also ensures that in spite of the gap, even in the case of high forces acting on the cutting insert, the two fork-like legs do not have a widening tendency. They are held together by the corresponding stop faces on the holder in the same way as a clip or clamp. The cutting insert is preferably in the form of a reversing or flip plate and correspondingly has two facing blades, which can be brought into use by reversing the cutting insert on the tool holder. Thus, on both sides of its opening, the cutting insert has corresponding conical surfaces.

To ensure that the cutting insert is pressed with pretension onto the corresponding stop faces of the tool holder, the centre axis of the fixing element and the associated axis of the opening or the gripping surface provided thereon are so dimensioned in their distances or spacings from the stop or orienting surfaces that the cutting insert produces a force acting in the direction of the stop faces on clamping the fixing element. For this purpose the spacing of the gripping head centre axis from the stop face is somewhat smaller than the spacing between the centre axis of the corresponding gripping surface and the orienting surface. However, these are only fractions of millimeters, but which still ensure an automatic tightening.

The invention also provides a cutting insert for tools for machine working, in which the cutting insert has a slot connecting the opening to an outer edge of the cutting insert and whose width is no smaller than that of the shaft section. It preferably has a triangular configuration with a substantially central opening and a slot provided in one corner and preferably blades are provided at the two other corners.

The method for fixing to or removing from a tool holder a cutting insert proposed by the invention provides for the cutting insert in the loosening position of the fixing element to be moved over or removed from the shank section of the fixing element transversely to the extension thereof. The fixing element can be moved by a screwing action between the loosening and the clamping position and the loosening position can be secured against further loosening so as to render the fixing element captive.

These and further features can be gathered from the claims, description and drawings and the individual features, both singly and in the form of subcombinations, can be implemented in an embodiment of the invention and in other fields and can represent advantageous, independently protectable constructions for which protection is claimed here. The subdivision of the application into individual sections and the subheadings in no way restricts the general validity of the statements made thereunder.

BRIEF DESCRIPTION OF THE DRAWINGS

Embodiments of the invention are described in greater detail hereinafter relative to the attached drawings, wherein show.

DETAILED DESCRIPTION OF PREFERRED EMBODIMENTS

Figure 1:
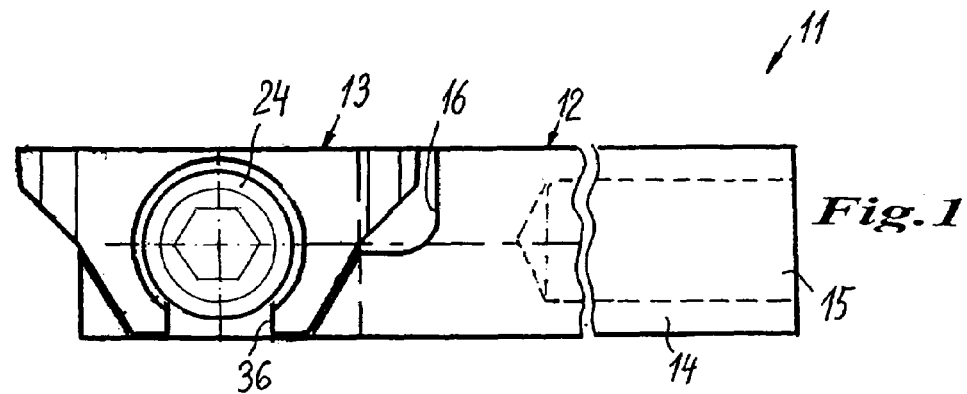
FIG. 1 A side view of a tool according to the invention with a fixed cutting insert.

FIGS. 1 to 4 show a tool 11 in a greatly enlarged form. It is intended for use in universal machines or automatic lathes, where small and usually precision mechanical parts are to be finished in a single setting. This involves internal and external turning, grooving, threading and other operations, which terminate with the cutting off of the workpiece from a rod guided by the automatic chuck. All these operations are performed in automatically controlled manner on the machine, so that the latter operates completely automatically. For this purpose the machine has a complete register of different cutting tools, which can be provided in the form of a displaceable linear register or as a turret head. Each of these tools has a blade with a specific profile able to engage in a working manner in the workpiece. In accordance with the machine type for which they are intended, these tools are also known as "Swiss Tools".

The tool 11 has a tool holder 12 and a cutting insert 13. The tool holder is made steel, but in its shank 14 for clamping to the machine it is provided with a hole, which is filled by a hard metal bar 15. In the manner described in the aforementioned DE 42 14 355 A, the latter also acts in a vibration-damping manner, which can be attributed to its material structure and particularly the high modulus of elasticity of hard metal.

At the opposite end of the tool holder a recess 16 is provided thereon and forms a receptacle for the cutting insert 13. On said recess are provided two stop faces 17, which are bevelled in such a way that they open to the centre of the recess. With an axis 18 at right angles to the tool holder a fixing element 19 in the form of a screw projects through there and is screwed into a thread 20 in the tool holder.

Figure 4:
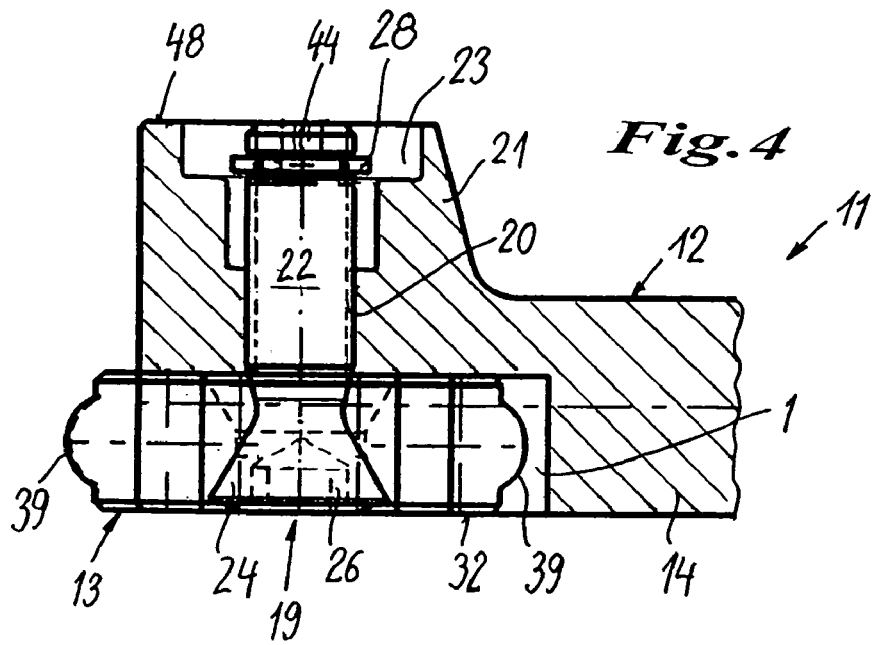
FIG. 4 A representation corresponding to FIG. 3 with a clamped cutting insert.

In the area carrying the cutting insert, the tool holder is provided with a laterally projecting projection 21, in which the screw shank 22 is received in a deep depression 23, also in the clamped state (FIG. 4).

The fixing element 19 has a gripping head 24 with a conical gripping head surface 25 and an internal key surface 26 for a tightening key 27. The key surface can be constructed in the manner of a hexagonal recess or a hexagonal socket head gripping surface. The gripping head is contracted somewhat towards the shank, but its external diameter is larger than the screw shank, including the thread provided thereon.

Figure 3:
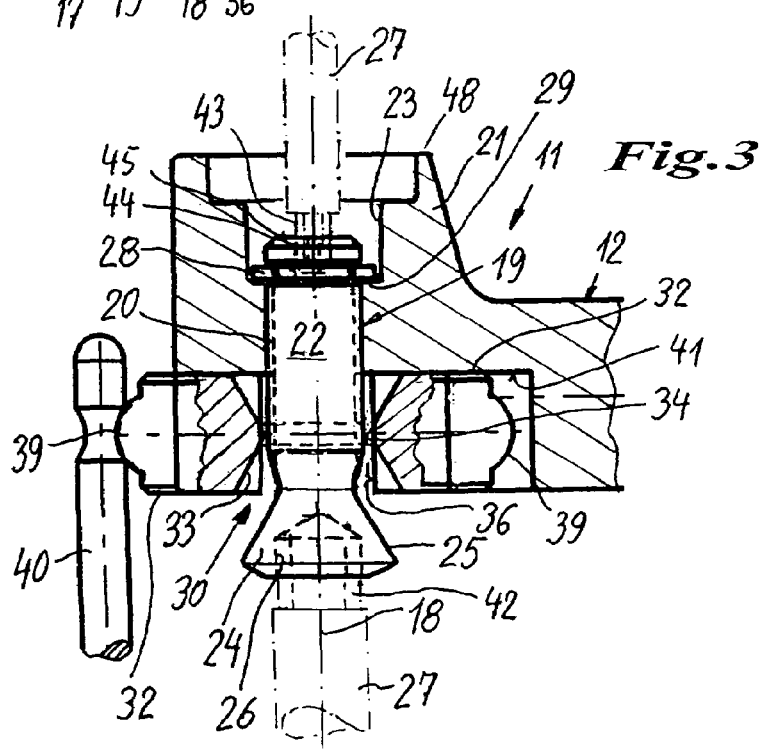
FIG. 3 A detail section through the tool holder with fitted, but not clamped cutting insert.

At the end of the screw shank 22 a circlip 28 is inserted in a groove and which in the loosening position of the fixing element 19 shown in FIG. 3 secures said element against a complete turning out from the thread 20 in that it strikes against the bottom surface 29 of the depression 23.

The cutting insert 13 is in the form of a relatively thick, trapezoidal, small hard metal plate. In its centre is provided an opening 30, which passes in circular manner about a centre axis 31. The opening is provided with in each case a conical depression symmetrically towards both sides 32 of the cutting insert and as a result gripping surfaces 33 are formed, which are constructed with matching angle and diameter conditions for the gripping head surface 25 of the fixing element. A narrow, cylindrical opening section 34 is provided between the two conical gripping surfaces 33.

A slot 36 passes from the short trapezoidal surface 35 of the cutting insert to the opening and its width is dimensioned in such a way that it fits over the screw shank. Its diameter is only slightly wider than the screw shank, i.e. between a few tenths and one or two millimeters wider. However, it is narrower than the external diameter of the gripping surface 33 to the extent that it cooperates with the gripping head 24. Consequently it can centre in the conical gripping surface in the clamped state and is not drawn into the slot.

The cutting insert forms a triangular yoke, whose legs 37 to both sides of the opening have on their outer surface orienting faces 38, whose angle and dimensions match the stop faces 17.

The two outer edges of the trapezoidal yoke form the blades 39 of the cutting insert and which are ground or profiled in accordance with their intended use. As a result of the completely symmetrical construction the cutting insert can be used as a small reversing plate, so that in each case one of the two blades 39 can be engaged in a workpiece 40.

The recess 16 in the tool holder has an inner stop face 41 with which the cutting insert 13 engages.

Figure 5:
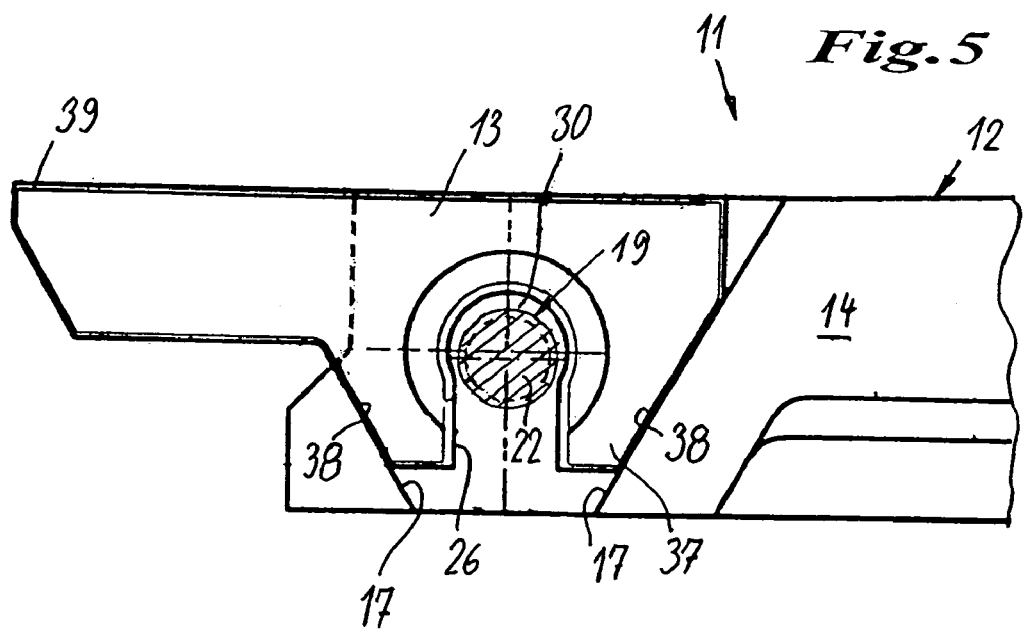
FIG. 5 A tool holder with a one-sided cutting insert with a significantly projecting blade.

FIG. 5 shows a tool 11, which is constructed for a cutting insert 13 having a relatively long and narrow blade 39, which is e.g. suitable for cutting off a larger diameter tool piece. This cutting insert only has one blade and is consequently not reversed. Otherwise all the features of the previously described tool are provided, except for a somewhat different design of the orienting and stop faces 38, 17. The fixing element 19 is shown in section.

Figure 6:
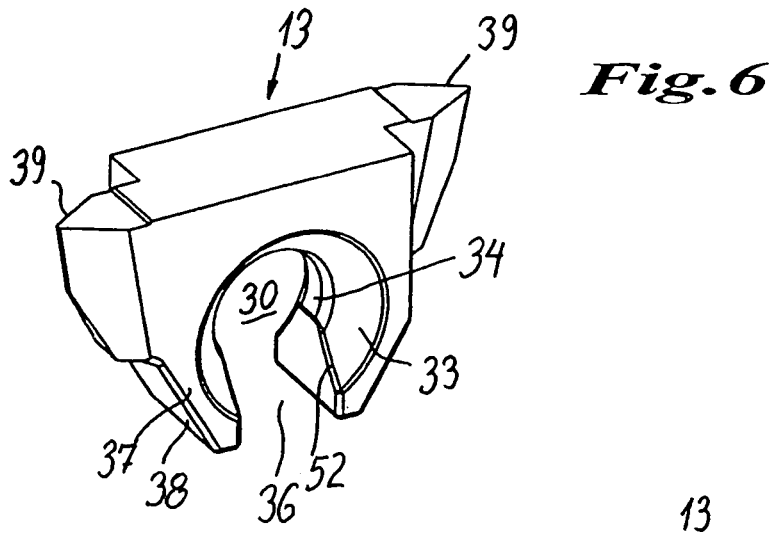
FIG. 6 A perspective view of a cutting insert.
Figure 7:
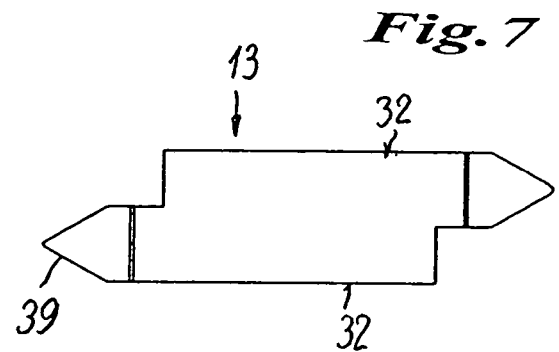
FIG. 7 A plan view.
Figure 9:
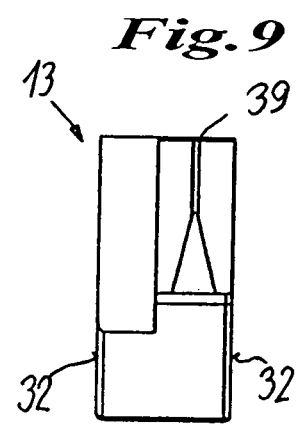
FIG. 9 A front view of the blade of a cutting insert according to FIG. 6.

FIGS. 6 and 9 clearly show the design of the cutting insert according to the invention. Reference should be made to these drawings with regards to the precise design. It can be seen that the cutting insert is small, compact, but still very stable. The gripping and fixing surfaces are very large compared with the size and moment arms on which the cutting forces act and are close to the blades. The production thereof from a hard metal sintered profile or sintered part is easy, working by grinding being the only requirement. This is a particular advantage compared with conventional cutting inserts, which are provided with two screws. Apart from the fitting disadvantages in that case the cutting insert is relatively long, not very stable and consequently tends to vibrate.

Figure 10:
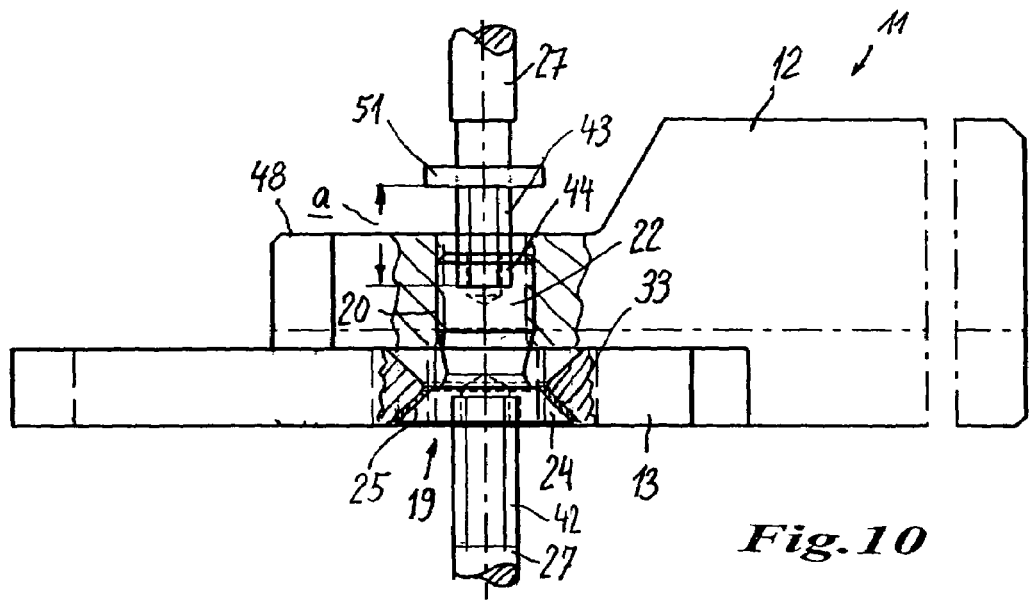
FIGS. 10 and 11 A part-sectional plan view of a tool with a clamped and unclamped cutting insert.
Figure 11:
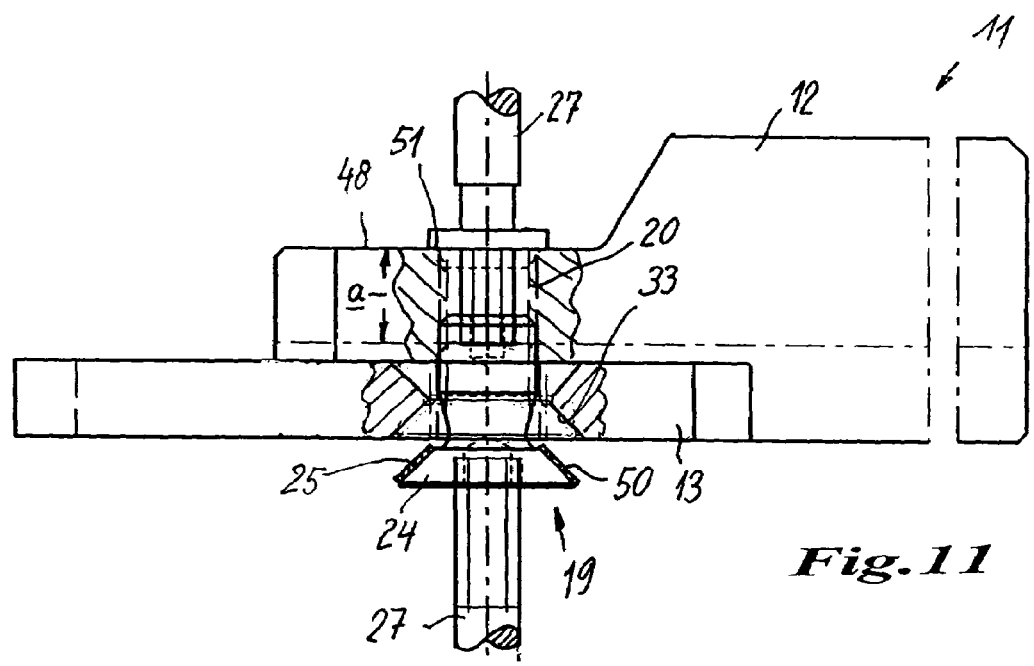

FIGS. 10 and 11 show a tool 11 with a tool holder 12 and a cutting insert 13 in much the same way as FIG. 5 and in plan view. It is noteworthy that between the gripping head 24 of the fixing element 19 and the associated conical gripping surface 33 a conical, annular disk 50 is provided, whose shape and width are adapted to the gripping head surface and therefore also the corresponding gripping surface 33 of the cutting insert 13. It acts as a washer and protects the gripping head surface 25 against damage by the edges of the slot 36 interrupting the gripping surface 33. It is loose and can, as shown in FIG. 11, be drawn off together with the gripping head 24, so that the cutting insert can be removed upwards.

In the embodiment of the fixing element 19 (cap screw) and tightening key 37 shown in FIGS. 10 and 11 there is no need to provide on the screw shank 22 a circlip 28 in the form shown in FIG. 3. The tightening key profiling 42, 43 is a hexagonal socket head profile on the side, which is associated with the internal key surface 44 in the screw shank 22, at a predetermined distance a from the end of the profiling 43, is fixed a disk forming a stop 51 and is sufficiently large for it to be able to strike against the back 48 of the tool holder 12 when the screw 19 is loosened. Instead of being in the form of a ring mounted on the tightening key 27, the stop 51 can also be formed by a sleeve or a corresponding thickening of the tightening key shank, which has the distance a from the end of the key surface 43.

METHOD

The method for fixing or removing the cutting insert 13 on or from the tool holder can be seen in FIGS. 1 to 4.

The fixing element is operated by means of the tightening key 27. As can be seen in FIG. 3, the latter has on one side a hexagonal socket head-like profiling 42, which matches the larger, internal key surface 26 in the gripping head 24 and on the other side of its L-shaped, bent shank it has a key surface 43 of the same type, but with smaller dimensions and which matches the internal key surface 44 in the end face 45 of the screw shank 22.

FIG. 3 shows the fixing element 19 in its loosening position where the gripping head 24 projects from the opening 30 and the gripping surfaces 25, 33 are not in engagement with one another. The fixing element 19 is unscrewed from the tool holder 14 to such an extent that the circlip 28 strikes against the bottom surface 29 and consequently provides security against loss of the screw.

Figure 2:
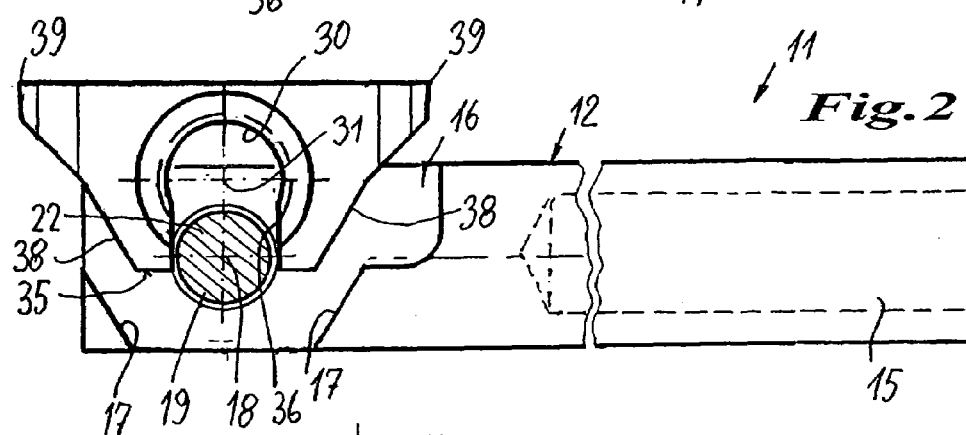
FIG. 2 A corresponding side view with the cutting insert released from the tool holder.

In the manner shown in FIG. 2, the cutting insert can be extracted upwards in this position, i.e. transversely to the longitudinal extension of the tool holder 14, in order to replace it by another screw or, after turning by 180ø, for reinsertion for using the opposite blade 39.

Following insertion the fixing element is brought back into the gripping or clamping position by screwing in (considered from the gripping head) and this is shown in FIGS. 1 and 4. In this position the gripping surface 32 engages on the gripping head surface 25 and presses the cutting insert with its one lateral face 32 against the stop face 41. As a result of the conical gripping surface 33 the cutting insert is self-centred and, assisted by the axial displacement between the axes 18 and 31 of the fixing element and opening, is pressed with the orienting faces 38 against the stop faces 17. Therefore the cutting insert is secured on the tool holder in its longitudinal position and orientation, as well as in its transverse orientation.

Gripping or clamping by the wedge-like orienting faces 38 in the corresponding wedge-shaped receptacle of the stop faces 17 also ensures that the forces exerted by the gripping head 24 and which act on the legs 37, do not lead to a widening of the slot 36. A corresponding, precisely ground cutting insert can consequently be reversed or replaced by another, corresponding cutting insert, without impairing the precise positioning of the blade relative to the workpiece 40.

Therefore the cutting insert can be replaced by an untrained person without the need for measuring or setting up activities and in particular without having to disassemble the tool holder 14 from the machine. This is inter alia made possible in that the fixing element 19 is accessible and operable from the back 48 of the tool holder opposite to the gripping head and cutting insert 13 through the insertion of the tightening key 27 in the key surface 44.

Figure 8:
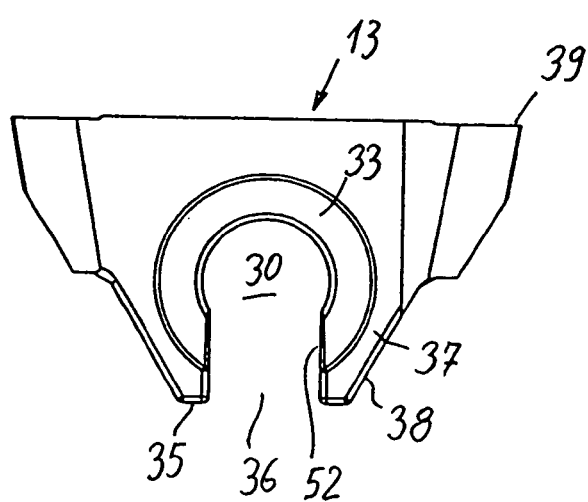
FIG. 8 A side view.

FIGS. 10 and 11 show the tool with tightening keys applied from both sides. In practice, application only takes place from one side. FIG. 10 shows that the conical annular disk 50 is located between the gripping surface 33 and the gripping head surface 25 and consequently protects the latter against damage by seizing or a certain cutting action on the edges 52 (cf. FIGS. 6 and 8) of the cutting insert 13. The annular disk can be rapidly replaced in that the fixing element 19 is completely unscrewed by means of the tightening key and its hexagonal socket head profiling 42 engaging in the gripping head.

As has been described hereinbefore, in practice the fixing element 19 is always screwed on and down from the tool holder back 48. For this purpose the spacing a between the stop face 51 and the end of the tightening key profiling 43 is dimensioned in such a way that it is shorter than the thread 20 in tool holder 12. Thus and as is shown in FIG. 10, the tightening key 27 can engage in the corresponding, internal key surface 44 and turn the fixing screw 19 between the clamping position (FIG. 10) and an opening position (FIG. 11). However, before the fixing screw 19 completely drops out of the thread 20, as a result of the stop 51 on the tool holder back 48 the tightening key 27 draws out of the gripping surface profiling 44 in the screw shank 22, so that the screw cannot be further unscrewed and consequently does not drop out of the thread 20. This creates automatic security against the loss of the fixing element 19.

What is claimed is:

1. A tool for machine working of workpieces, comprising:
a tool holder having a fixing element with a shank section and a gripping head thicker than the shank section, and
a cutting insert to be fixed to the tool holder, the cutting insert having at least one blade,
an opening for the fixing element, and
at least one gripping surface cooperating with the gripping head,
wherein the tool holder has tensioning means for the fixing element,
wherein the cutting insert has a slot connecting the opening to an outer edge of the cutting insert, and
wherein the slot has a width not smaller than the thickness of the shank section.

2. Tool according to claim 1, wherein the fixing element is placed in captive manner in the tool holder.

3. Tool according to claim 1, wherein the fixing element is operable for clamping and unclamping purposes from the back of the tool holder opposite to the cutting insert.

4. Tool according to claim 2, wherein the fixing element is operable from both sides.

5. Tool according to claim 1, characterized in that the cutting insert is constructed as a reversible plate and with a gripping surface on both sides of the opening.

6. Tool according to claim 1, wherein the fixing element is a screw with internal key surfaces on both end faces and the tensioning means is an internal thread in the tool holder.

7. Tool according to claim 6, wherein the screw is engaged by a rotatable tightening key, having an engagement depth for engaging in at least one of the key surfaces, the engagement depth being so limited with respect to the tool holder by a stop that its rotation is interrupted before a thread of the fixing element and the tool holder are disengaged.

8. Tool according to claim 1, wherein the gripping head and associated gripping surface are substantially conical.

9. Tool according to claim 1, wherein between the gripping head and the associated gripping surface is provided a washer adapted thereto.

10. Tool according to claim 1, wherein the width of the slot is smaller than the transverse dimensions of the gripping head.

11. Tool according to claim 1, wherein the cutting insert has at least one leg bounding the slot.

12. Tool according to claim 1, wherein the cutting insert has at least one orienting face and the tool holder at least one stop face cooperating with the orienting face.

13. Tool according to claim 12, wherein on both sides of the slot are provided orienting faces on the outside of legs bounding the opening.

14. Tool according to claim 12, wherein the gripping head and gripping surface are substantially conical and have central axes, the axes being so positioned with respect to the at least one orienting face and stop face that the spacing of the gripping head central axis from the stop face is somewhat smaller than the spacing of the central axis of the gripping face from the orienting face.

15. Tool according to claim 1, wherein the tool holder has a shank being provided with a hard metal core.

16. Tool according to claim 1, being a tool for universal machines by lathe working.

17. A cutting insert for tools for machine working of workpieces for fixing to a tool holder with a fixing element including a shank section and a gripping head, the cutting insert comprising:

at least one blade;
an opening for the fixing element; and
a gripping surface for the gripping head;
wherein the cutting insert has a slot connecting the opening to an outer edge of the cutting insert, the slot having a width that is not smaller than that of the shank section.

18. Cutting insert according to claim 17, wherein the cutting insert is triangular with three corners, with a substantially central opening and with a slot provided in one corner and where blades are provided at the two other corners.

19. A method for fixing or removing a cutting insert having an opening open to one side of the cutting insert to or from a tool holder, the method comprising the steps of:

providing a fixing element inserted in the tool holder, the fixing element having a shank section and a gripping head with a diameter larger than the cutting insert opening and larger than the shank section;

moving the fixing element between a gripping position and a loosening position such that in the loosening position the shank section is proximate the cutting insert opening; and extracting the cutting insert, in the loosening position of the fixing element, by moving the cutting insert opening over or from the shank section of the fixing element transversely to the extension of the shank section.

20. Method according to claim 19, wherein the fixing element is a screw inserted into the tool holder, which can be moved in screwing manner between the loosening and gripping positions and wherein the fixing element in its loosening position is secured in a captive manner.

* * * * *